3,444,206
PROCESS FOR MANUFACTURE OF (OPTIONALLY-2-ALKYLATED) CYCLOPENTANE-1,3-DIONES
Raphael Pappo, Skokie, and Mike G. Scaros, Arlington Heights, Ill., assignors to G. D. Searle & Co., Chicago, Ill., a corporation of Delaware
No Drawing. Filed Dec. 2, 1966, Ser. No. 598,618
Int. Cl. C07c 49/28, 45/16
U.S. Cl. 260—586                 10 Claims

ABSTRACT OF THE DISCLOSURE

Process for catalytic hydrogenolysis of (optionally 2 - alkylated) cyclopentane - 1,3,4 - triones or (optionally 2 - alkylated) 4 - hydroxyclopentane-1,3-diones to afford the corresponding (optionally 2-alkylated) cyclopentane-1,3-diones, which are useful as intermediates in the manufacture of commercially valuable steroids.

---

The present invention is concerned with a process for the manufacture of cyclic 1,3-diketones by selective hydrogenolysis of the corresponding 1,3-4-triketones or 4-hydroxy-1,3-diketones and, more particularly, with a process for the manufacture of (optionally 2-alkylated) cyclopentane-1,3-diones by catalytic hydrogenolysis with a palladium catalyst of the corresponding (optionally 2-alkylated) cyclopentane-1,3,4-triones or (optionally 2-alkylated) 4-hydroxy-cyclopentane-1,3-diones.

The 1,3-diketones produced by the process of the present invention are represented by the following structural formula

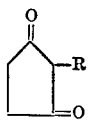

wherein R can be hydrogen or a lower alkyl radical.

The lower alkyl radicals encompassed by the R term in the foregoing structural representation are typified by methyl, ethyl, propyl, butyl, pentyl, hexyl, heptyl and the branched-chain groups isomeric therewith.

The 1,3-diketones obtained according to the instant process are of particular interest as intermediates in the manufacture of commercially valuable steroids.

Hughes et al., Chemistry and Industry, 1960, 1022 thus describe the conversion of 2-methylcyclopentane-1,3-dione to the female sex hormone, estrone.

The result achieved by the instant process, i.e., catalytic hydrogenolysis of an aliphatic keto group by use of a palladium catalyst, is completely unexpected in view of the teachings of the prior art. Breitner et al., J. Org. Chem., 24, 1855 (1959) thus describe the hydrogenolysis of an aromatic ketone, i.e., acetophenone, with a palladium catalyst to afford ethylbenzene, but state that palladium catalysts are ineffective for the reduction of aliphatic ketones. Previous investigators working in the area encompassed by the present invention have utilized a platinum catalyst to effect the desired conversion. Orchin and Butz, J. Am. Chem. Soc., 65, 2296 (1943) thus obtained a 15% yield of 2-methylcyclopentane-1,3-dione by the hydrogenolysis of 3-methylcyclopentane-1,2,4-trione, utilizing platinum as a catalyst. Subsequently, Boyce et al., J. Chem. Soc., 1959, 2022, increased the yield to 31% by conducting the reaction in acetic acid in the presence of perchloric acid. By the instant process, however, a yield of 75–80% of pure 2-methylcyclopentane-1,3-dione is achieved.

The process of the present invention utilizes as starting materials compounds of the following structural formula

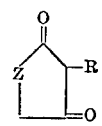

wherein R is hydrogen or a lower alkyl radical and Z can be a carbonyl or hydroxymethylene radical. This process is conveniently conducted at or near room temperature at a pressure of 1–3 atmospheres. An inert organic solvent, e.g., a lower alkanoic acid such as acetic or propionic and ethers such as tetrahydrofuran and dioxane is preferably used. The use of acetic acid is especially advantageous in that the shortest reaction times and highest yields are achieved. In order to obtain the highest yields, a strong acid catalyst is added to the reaction mixture. The concentration of acid is not critical, a range of 1–10% being suitable and a concentration of about 2% being particularly preferred. Particularly advantageous acids are sulfuric, perchloric, and boron trifluoride.

The selective hydrogenolysis of this invention is achieved by the use of a variety of palladium catalysts. Those supported on carbon are, however, especially preferred in a view of their greater reactivity.

A specific example of the instant process is the reaction of 3-methylcyclopentane-1,2,4-trione with hydrogen at 1–3 atmospheres pressure and room temperature in acetic acid solution containing concentrated sulfuric acid and 5% palladium-on-carbon catalyst, thus resulting in 2-methylcyclopentane-1,3-dione.

The invention will appear more fully from the examples which follow. These examples are given by way of illustration only and are not to be construed as limiting the invention either in spirit or in scope as many modifications both in materials and methods will be apparent from this disclosure to those skilled in the art. In these examples temperatures are given in degrees centigrade (° C.) and quantities of materials are indicated in parts by weight unless otherwise noted.

Example 1

A mixture of 100 parts of 3-methylcyclopentane-1,2,4-trione, 1,050 parts of acetic acid, 147.2 parts of concentrated sulfuric acid and 30 parts of 5% palladium-on-carbon catalyst is shaken with hydrogen at room temperature and an initial pressure of 3 atmospheres for approximately 1½ hours. An exothermic reaction initially occurs causing a temperature rise to 40–45°. At the end of the reaction period the catalyst is removed by filtration and 61.6 parts of solid ammonium acetate is added. The resulting mixture is stirred for approximately 30 minutes and the ammonium sulfate formed is removed by filtration. The filter cake is washed with warm acetic acid and the combined filtrate and washings are stripped of solvent by distillation under reduced pressure to afford the crude product. Purification of that material by recrystallization from water affords pure 2-methylcyclopentane-1,3-dione, which melts at about 212–214°, and is represented by the following structural formula

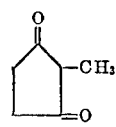

Example 2

A mixture containing 3.15 parts of 3-methylcyclopentane-1,2,4-trione, 99.8 parts of acetic acid, 5 parts by volume of a 5% boron trifluoride in acetic acid solution and 1 part of 10% palladium-on-carbon catalyst is shaken with hydrogen at room temperature and an initial pressure of 3 atmospheres for approximately 100 minutes. There is an initial temperature rise to approximately 45°. The catlyst is removed by filtration at the end of the reaction period and the filtrate is concentrated to dryness under reduced pressure. Crystallization of the resulting crude product from water affords pure 2-methylcyclopentane-1,3-dione, melting at about 208–211°.

Example 3

A mixture containing 5.03 parts of 3-methylcyclopentane-1,2,4-trione, 5 parts by volume of 60% aqueous perchloric acid, 210 parts of acetic acid and 1.7 parts of 10% palladium-on-carbon catalyst is shaken with hydrogen at 3 atmospheres initial pressure and room temperature for approximately 2 hours. At the beginning of that reaction period, the temperature rises to approximately 45°. To the reaction mixture is then added a solution of 5.25 parts of sodium acetate in 15.75 parts of acetic acid, and the resulting mixture is stirred for about 10 minutes, then is filtered to remove the inorganic salts. The filtrate is concentrated to dryness under reduced pressure, and the resulting crude dione is purified by recrystallization from water to afford pure 2-methylcyclopentane-1,3-dione, which displays a melting point at about 209–212°.

Example 4

To a solution of 5 parts of 3-methylcyclopentane-1,2,4-trione in 210 parts of acetic acid is added 1.5 parts of 10% palladium-on-carbon catalyst, and the resulting reaction mixture is shaken at room temperature with hydrogen at an initial pressure of 3 atmospheres for approximately 24 hours. At the end of that time the catalyst is removed by filtration, and the filtrate is distilled to dryness under reduced pressure. Crystallization of the crude product from water affords pure 2-methylcyclopentane-1,3-dione, melting at about 208–214°.

Example 5

To a solution of 6 parts of 3-methylcyclopentane-1,2,4-trione in 54 parts of tetrahydrofuran containing 8.83 parts of concentrated sulfuric acid is added 2 parts of 5% palladium-on-carbon catalyst, and that reaction mixture is shaken at room temperature with hydrogen at an initial pressure of 3 atmospheres for approximately 24 hours. The catalyst is then removed by filtration, and the filtrate is neutralized by the cautious addition of a 50% aqueous solution containing 3.76 parts of sodium hydroxide. The mixture is stirred, then filtered to remove sodium sulfate, and the filtrate is stripped of solvent by distillation under reduced pressure. Recrystallization of the resulting crude product from water affords pure 2-methylcyclopentane-1,3-dione, melting at about 210–212°.

Example 6

When an equivalent quantity of cyclopentane-1,2,4-trione is substituted in the procedure of Example 1, there is produced cyclopentane-1,3-dione.

Example 7

The substitution of an equivalent quantity of 3-ethylcyclopentane-1,2,4-trione in the procedure of Example 1 results in 2-ethylcyclopentane-1,3-dione.

Example 8

A mixture of 3.15 parts of 4-hydroxy-2-methylcyclopentane-1,3-dione, 105 parts of acetic acid, 1.8 parts of concentrated sulfuric acid and 1 part of 10% palladium-on-carbon catalyst is shaken at room temperature and 3 atmospheres initial pressure with hydrogen for about 75 minutes, then is filtered to remove the catalyst. The filtrate is neutralized by the addition of 1.93 parts of solid ammonium acetate, and the resulting mixture is stirred for about 30 minutes, then is filtered. The filter cake is washed with warm acetic acid, and the combined filtrate and washings are concentrated to dryness under reduced pressure to afford the crude product. Purification of that material by recrystallization from water affords pure 2-methylcyclopentane-1,3-dione, melting at about 211–213°.

Example 9

When an equivalent quantity of 4-hydroxy-2-ethylcyclopentane-1,3-dione is reduced according to the procedure described in Example 8, there is obtained 2-ethylcyclopentane-1,3-dione.

What is claimed is:

1. A process for the manufacture of a compound of the formula

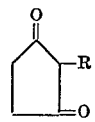

wherein R is selected from the group consisting of hydrogen and a lower alkyl radical, which comprises contacting a compound of the formula

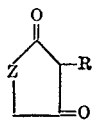

wherein R is as above defined and Z is a member of the class consisting of carbonyl and hydroxymethylene radicals, with hydrogen in the presence of a catalyst selected from the group consisting of sulfuric acid, perchloric acid and boron trifluoride and a palladium catalyst.

2. As in claim 1, a process for the manufacture of a compound of the formula

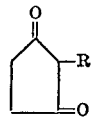

wherein R is selected from the group consisting of hydrogen and a lower alkyl radical, which comprises contacting a compound of the formula

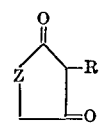

wherein R is as above defined and Z is a member of the class consisting of carbonyl and hydroxymethylene radicals, with hydrogen in the presence of a catalyst selected from the group consisting of sulfuric acid, perchloric acid and boron trifluoride a palladium catalyst and acetic acid.

3. As in claim 1, a process for the manufacture of a compound of the formula

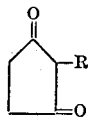

wherein R is selected from the group consisting of hydrogen and a lower alkyl radical, which comprises contacting a compound of the formula

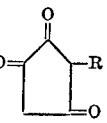

wherein R is as above defined, with hydrogen in the presence of a palladium catalyst, a catalyst selected from the group consisting of sulfuric acid, perchloric acid and boron trifluoride and acetic acid.

4. As in claim 1, a process for the manufacture of a compound of the formula

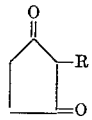

wherein R is selected from the group consisting of hydrogen and a lower alkyl radical, which comprises contacting a compound of the formula

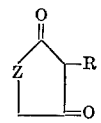

wherein R is as above defined and Z is a member of the class consisting of carbonyl and hydroxymethylene radicals, with hydrogen in the presence of a palladium catalyst, acetic acid and a catalytic quantity of sulfuric acid.

5. As in claim 1, a process for the manufacture of a compound of the formula

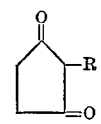

wherein R is selected from the group consisting of hydrogen and a lower alkyl radical, which comprises contacting a compound of the formula

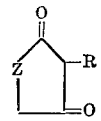

wherein R is as above defined and Z is a member of the class consisting of carbonyl and hydroxymethylene radicals, with hydrogen in the presence of a palladium catalyst, acetic acid and a catalytic quantity of perchloric acid.

6. As in claim 1, a process for the manufacture of 2-methylcyclopentane-1,3-dione which comprises contacting 3-methylcyclopentane-1,2,4-trione with hydrogen in the presence of a palladium catalyst, acetic acid and a catalytic quantity of sulfuric acid.

7. As in claim 1, a process for the manufacture of 2-methylcyclopentane-1,3-dione which comprises contacting 4-hydroxy-2-methylcyclopentane-1,3-dione with hydrogen in the presence of a palladium catalyst, acetic acid and a catalytic quantity of sulfuric acid.

8. As in claim 1, a process for the manufacture of 2-methylcyclopentane-1,3-dione which comprises contacting 3-methylcyclopentane-1,2,4-trione with hydrogen in the presence of a palladium catalyst, acetic acid and a catalytic quantity of boron trifluoride.

9. As in claim 1, a process for the manufacture of 2-methylcyclopentane-1,3-dione which comprises contacting 3-methylcyclopentane-1,2,4-trione with hydrogen in the presence of a palladium catalyst, acetic acid and a catalytic quantity of perchloric acid.

10. As in claim 1, a process for the manufacture of 2-methylcyclopentane-1,3-dione which comprises contacting 3-methylcyclopentane-1,2,4-trione with hydrogen at 3 atmospheres initial pressure and a temperature of 20–45° in the presence of a palladium catalyst, acetic acid and a catalytic quantity of sulfuric acid.

References Cited

UNITED STATES PATENTS 3,278,588   10/1966   Pappo _____ 260—586

OTHER REFERENCES

Boyce et al.: "J. Chem. Soc.," pp. 2022 to 2023 (1959).

LEON ZITVER, *Primary Examiner.*

MATTHEW M. JACOB, *Assistant Examiner.*